Sept. 26, 1961 R. L. FISCHER 3,001,588
PROPELLER BLADE ANGLE CONTROL
Filed July 27, 1959 2 Sheets-Sheet 2
FIG_2
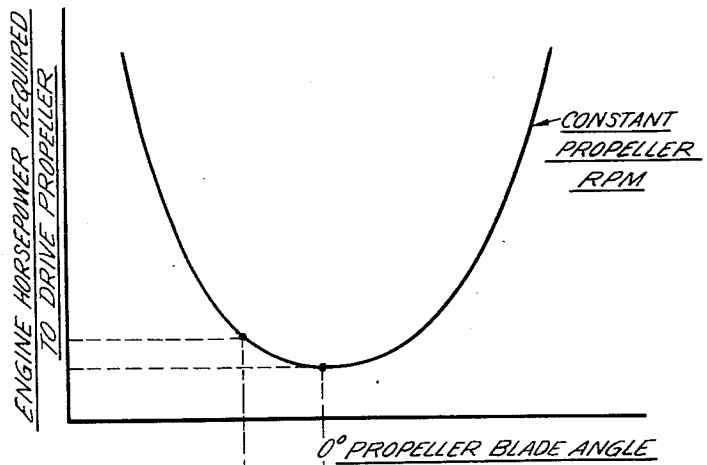
FIG_3
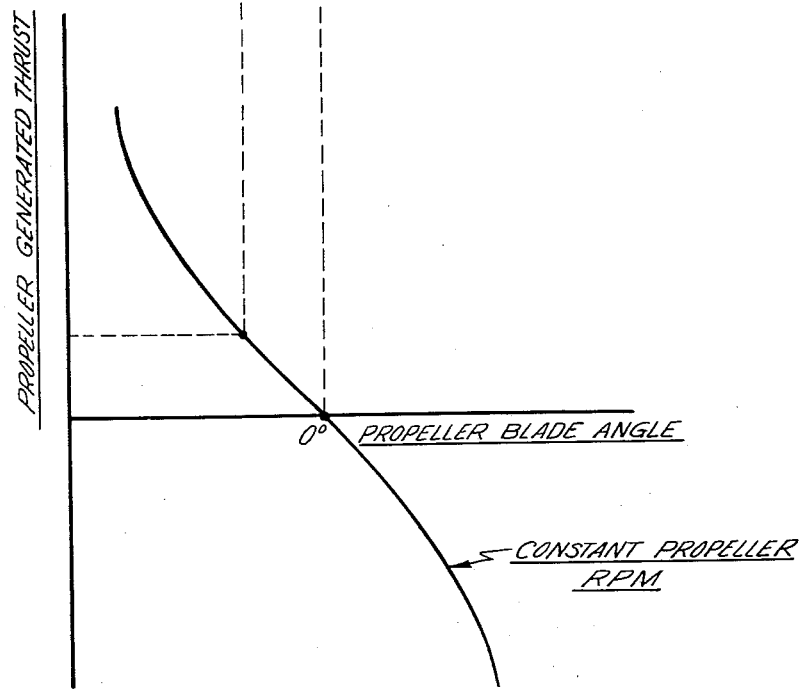
INVENTOR
RICHARD L. FISCHER
BY Vernon F. Hauschild
ATTORNEY

United States Patent Office 3,001,588
Patented Sept. 26, 1961

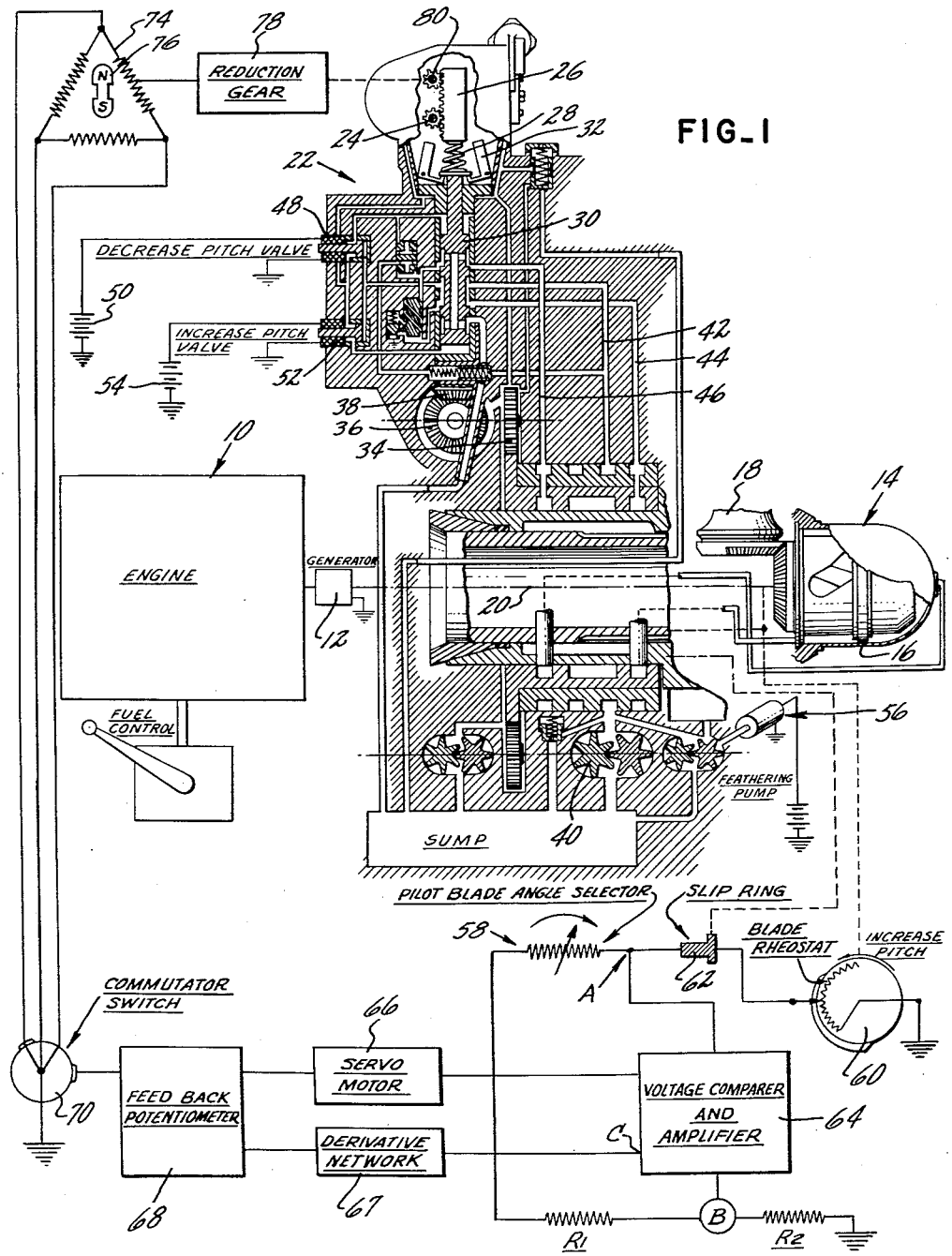
FIG_1

3,001,588
PROPELLER BLADE ANGLE CONTROL
Richard L. Fischer, Suffield, Conn., assignor to United Aircraft Corporation, East Hartford, Conn., a corporation of Delaware
Filed July 27, 1959, Ser. No. 829,709
5 Claims. (Cl. 170—160.14)

This invention relates to variable pitch propellers and more particularly to the control used to regulate propeller generated thrust during ground operation.

It is an object of this invention to provide apparatus for controlling the propeller generated thrust and the propeller blade pitch throughout the negative pitch range and the adjacent portion of the positive pitch range by changing the speed setting of a speed sensitive governor so that speed is varied to maintain constant pitch in the aforementioned ranges. This object is accomplished smoothly, efficiently and with minimum complication.

It is a further object of this invention to teach a propeller control which is speed sensitive throughout most of its positive pitch range and which is blade angle sensitive throughout the negative pitch range and the positive pitch range immediately adjacent thereto.

It is a further object of this invention to provide propeller control means which is normally speed sensitive but which is caused to become blade angle sensitive during a portion of its operation by varying the control speed setting.

Other objects and advantages will be apparent from the specification and claims and from the accompanying drawings which illustrate an embodiment of the invention.

FIG. 1 is a schematic showing of an engine driven propeller and the control system therefor.

FIG. 2 is a graphic representation illustrating engine horsepower required to drive the propeller through the complete propeller pitch range.

FIG. 3 is a graphic representation of propeller generated thrust through the complete propeller pitch range.

Normally, the propeller control or governor performs the broad function of maintaining the propeller speed constant regardless of the engine horsepower developed and accomplishes this function by varying the propeller blade pitch, and hence its resistance to rotation and horsepower absorption capacity, to restore the propeller to desired speed. This positive pitch range generates propulsive thrust in substantial quantities so that the propeller operates therein during periods of flight. During landing, taxiing, or stationary ground operation, this substantial positive thrust derived in the positive pitch range is not desired. Negative thrust must be developed during airplane landing operation for airplane braking purposes and this is accomplished by causing the propeller to reverse pitch and thereby generate a negative thrust. A small positive thrust is desired for airplane taxiing and zero thrust generation is desired during engine warm-up and other stationary ground operation. A control of the type just described wherein the propeller blade pitch is varied to maintain the propeller speed constant during the positive pitch range operation would be ineffective to control the propeller during the reverse pitch range operation for the propeller sensitivity is then reversed, that is, an increase in blade pitch angle reduces the horsepower absorbed by the propeller in reverse pitch whereas such a pitch change would have increased the propeller horsepower absorption capacity in positive pitch. Further, in the region of lowest positive pitch, a substantial propeller blade angle change is required to absorb small engine horsepower changes and this large pitch change generates large and unacceptable thrust changes. This is best illustrated in FIGS. 2 and 3 wherein it will be noted that due to the substantially flat scope of curve 2 immediately adjacent the zero degree propeller blade angle point in the positive pitch range, a substantial pitch change is required to absorb a very small horsepower change, which propeller blade pitch angle change, as best shown in FIG. 3, would create a substantial propeller generated thrust change and hence would either substantially alter the velocity of a taxiing airplane or place a stationary airplane into motion.

Since, for the reasons just discussed, propeller generated thrust control is of major importance during the negative pitch range and a small portion of the positive pitch range immediately adjacent thereto, the combination of which ranges is known as the beta range, my control has been designed to control propeller generated thrust in the beta range by maintaining propeller pitch, and hence the thrust generating capacity of the propeller, constant at a pitch selected by the pilot to accomplish the desired airplane operation.

Such a control has been attempted in the past, for example in U.S. Patent No. 2,840,169, but proved to be inefficient because it was a switching system and hence was cyclic, which cyclic operation could be relieved in part only by introducing a substantial deadband and this brought about control inaccuracies. The control taught herein and now to be described provides accurate propeller generated thrust control during the beta range by accurately controlling propeller blade angle or pitch and does so without the necessity of a deadband for it is a proportional control system.

Referring to FIG. 1 we see aircraft engine 10, which may be of the type taught in U.S. Patent Nos. 2,711,631 or 2,426,879, which drives generator 12 and variable pitch propeller 14. Propeller 14 comprises pitch change motor 16, which is basically a hydraulic piston-cylinder unit operatively connected to a plurality of circumferentially positioned and radially extending propeller blades 18 such that piston translation within the pitch change motor causes rotation and hence variation of the pitch of propeller blades 18 throughout their complete positive and negative pitch range, including the aforementioned beta range which comprises the negative pitch range and a small portion of the positive pitch range immediately adjacent thereto. Engine 10 normally includes a reduction gear (not shown) which drives propeller drive shaft 20 so that the horsepower generated by engine 10 is absorbed by propeller 14. When the horsepower generated by engine 10 is absorbed exactly by propeller 14, the speed of propeller 14 is maintained constant. Should the engine generated horsepower then increase, the speed of propeller 14 would increase and must be returned by the action of control or governor 22, in a fashion to be described hereinafter, to the pilot selected speed by increasing the pitch of propeller blades 18 and hence increasing their horsepower absorption capacity so as to balance the engine generated horsepower. Should the engine generated horsepower decrease, control 22 would act to decrease the pitch of propeller blades 18 until the engine generated and propeller absorbed horsepower were again equal, at which time propeller 14 would be rotating at control speed. In this fashion, control 22 maintains the speed of propeller 14 constant throughout the positive pitch range regardless of changes in engine generated horsepower.

For positive thrust generation, pilot lever 24, acting as a pinion on rack 26, may be used to establish the "setting" of speeder spring 28, thus determining the speed at which propeller 14 is to rotate. Governor or control 22 includes pilot valve 30 which is positionable to regulatably control the flow of hydraulic actuating fluid to pitch change motor 16. The position of pilot valve 30 is determined by the coaction of governor flyweights 32, which are mounted to rotate as a function of the speed of propeller 14 due to its connection thereto through gears 34, 36 and 38 and are positioned to actuate pilot valve 30 in opposition to speeder spring 28. When the speed of propeller 14 exceeds the pilot selected value, centrifugal force causes an outward motion to flyweight 32 which overcomes the pilot valve positioning force of speeder spring 28, thereby causing pilot valve 30 to move toward flyweights 32 and increase the pitch of propeller blades 18 and this reduces the speed of propeller 14, whereupon speeder spring 28 will overcome the force of flyweights 32 to return pilot valve 30 to its original position, at which time propeller 14 has been returned to its pilot selected speed.

Hydraulic actuating fluid is provided to control 22 from the sump by pump 40 which causes fluid to flow through line 42 to pilot valve 30 and to be directed therefrom by the position of pilot valve 30 through either decrease pitch line 44 to the decrease pitch side of pitch change motor 16 or through increase pitch line 46 to the pitch increase side of pitch change motor 16. The position of pilot valve 30, governed by the coaction of governor flyweights 32 and speeder spring 28, controls and regulates the flow of hydraulic fluid in the fashion just described from the propeller sump to pitch change motor 16. Control or governor 22 is provided with decrease pitch valve 48, which is solenoid actuated by power supplied from electric power source 50 and which directs actuating fluid from pump 40 to the top of pilot valve 32 to force the pilot valve down and hence direct said fluid through decrease pitch line 44 to pitch change motor 16 to decrease the pitch of propeller blades 18. Increase pitch valve 52, which is solenoid actuated by power from electric source 54, directs fluid from pump 40 to the under side of pilot valve 30 and thence through increase pitch line 46 to pitch change motor 16 to increase the pitch of propeller blades 18. Feathering pump 56 is provided to supply pitch change fluid to the pitch change motor 16 through decrease pitch valve 48 and increase pitch valve 52 during periods when the propeller 14 is stationary.

It is considered that the description of propeller 14 and control 22 given is sufficient for the purpose of describing this invention and for a more particular description of each, reference may be made to U.S. Patent Nos. 2,477,868 and 2,653,668.

To this point, the operation of control 22 to maintain the speed of propeller 14 constant during periods of positive pitch operation has been described. The portions of control 22 which will be used during the aforementioned beta range will now be described.

During beta range operation, the pilot is able to control the propeller generated thrust by controlling the propeller blade angle or pitch. Pilot blade angle selector 58 may be set by the pilot lever or by other pilot actuated means to the selected blade angle which will produce the required propeller generated thrust. Pilot blade angle selector 58 may be a potentiometer. Rotatable rheostat 60, which is actuated by propeller shaft 20, is connected electrically to blade angle selector rheostat 58 through propeller shaft actuated slip ring 62. These resistors in conjunction with resistors $R_1$ and $R_2$ form a Wheatstone bridge. The voltage across terminals A and B is proportional to blade angle error. Voltage comparer and amplifier 64 compares the blade angle error voltage across terminals A and B to a feedback voltage at terminal C. The difference in these voltages is amplified and transmitted to servo motor 66 which rotates at a rate proportional to this voltage. The servo motor rotates a feedback potentiometer 68 which is connected in feedback fashion to voltage comparer 64 at C through a derivative network 67. This feedback potentiometer 68 is used to improve the stability of the system. The servo motor also rotates commutator switch 70. The signals from commutator switch 70 are provided to electric stepmotor 74 to cause rotation of armature 76 thereof. Armature 76, acting through reduction gear 78, transfers a rotary motion to pinion 80. Since the teeth of pinion 80 engage the teeth of rack 26, the rotation of pinion 80 changes the loading or compression of speeder spring 28 and hence the speed setting of control or governor 22 in accordance with the signal determined by comparer 64. Accordingly, during propeller beta range operation, speed sensitive governor or control 22 is caused to become blade angle or pitch error sensitive by the mechanism and in the manner just described to change the speed setting of governor 22 and the position of the pilot valve 30 as required to maintain the blade angle or pitch of propeller blades 18 equal to the blade angle selected by the pilot on pilot blade angle selector 58.

It is to be understood that the invention is not limited to the specific embodiment herein illustrated and described but may be used in other ways without departure from its spirit as defined by the following claims.

I claim:

1. A variable blade pitch propeller, pitch change means to vary propeller blade pitch through a first pitch range which includes the full negative pitch range and the first few degrees of the positive pitch range and a second pitch range which includes the remainder of said positive pitch range, a governor including speed selecting means and propeller speed error sensing means operatively connected to said pitch change means to vary blade pitch and maintain propeller speed constant throughout said second pitch range, and pilot operated pitch selecting means including pitch error sensing means operatively connected to said governor and causing said governor to become pitch error sensitive throughout said first range.

2. A variable blade pitch propeller, a hydraulic pitch change motor to vary propeller blade pitch through a first pitch range which includes the full negative pitch range and the adjacent portion of the positive pitch range and a second pitch range which includes the remainder of said positive pitch range, a pilot valve positionable to controllably direct hydraulic actuating fluid to said motor, propeller speed error responsive means to vary blade pitch to maintain propeller speed constant throughout said second range comprising flyweights actuatable to position said pilot valve and a speeder spring set to prevent flyweight actuation until a selected propeller speed is reached, and pitch selecting means including pitch error sensing means operatively connected to said governor and operable in said first range to vary the setting of said speeder spring and hence propeller speed in response to pitch error to maintain constant pitch.

3. A variable pitch propeller, pitch change means operatively connected to said propeller to vary the pitch thereof through a first and second range, a speed sensitive governor operatively connected to said pitch change means to vary pitch and maintain propeller speed constant throughout said first range, and pitch selecting means including pitch error sensing means operatively connected to said governor and operative in said second range to vary the speed setting of said governor in response to pitch error to maintain propeller pitch constant.

4. A variable pitch propeller, pitch change means operatively connected to said propeller to vary the pitch thereof, a speed sensitive governor operatively connected to said pitch change means to vary pitch, and pitch selecting means including pitch error sensing means operatively connected to said governor and operative to vary the speed setting of said governor in response to pitch error to maintain propeller pitch constant.

5. A variable pitch propeller, pitch change means operatively connected to said propeller to vary the pitch thereof through a first and second range, a speed sensitive governor operatively connected to said pitch change means to vary pitch and maintain propeller speed constant throughout said first range, pilot operated pitch selecting means operative in said second range, means to determine selected pitch error, and means responsive to said selected pitch error and operatively connected to said governor to vary the speed setting of said governor and hence the speed of said propeller to maintain propeller pitch constant.

References Cited in the file of this patent

UNITED STATES PATENTS

| | | |
|---|---|---|
| 2,781,856 | Danvers | Feb. 19, 1957 |
| 2,840,169 | Farkas | June 24, 1958 |